United States Patent
Ardes

(10) Patent No.: US 9,700,819 B2
(45) Date of Patent: Jul. 11, 2017

(54) LIQUID FILTER WITH A CENTRAL DISCHARGE CHANNEL AND FILTER UNIT FOR A LIQUID FILTER

(71) Applicant: Hengst SE & Co. KG, Muenster (DE)

(72) Inventor: Wilhelm Ardes, Ascheberg (DE)

(73) Assignee: Hengst SE & Co. KG, Muenster (DE)

( * ) Notice: Subject to any disclaimer, the term of this patent is extended or adjusted under 35 U.S.C. 154(b) by 0 days.

(21) Appl. No.: 14/411,424

(22) PCT Filed: Jun. 21, 2013

(86) PCT No.: PCT/EP2013/062974
§ 371 (c)(1),
(2) Date: Dec. 26, 2014

(87) PCT Pub. No.: WO2014/001214
PCT Pub. Date: Jan. 3, 2014

(65) Prior Publication Data
US 2015/0157968 A1 Jun. 11, 2015

(30) Foreign Application Priority Data
Jun. 26, 2012 (DE) .......................... 10 2012 210 900

(51) Int. Cl.
*B01D 35/16* (2006.01)
*B01D 35/30* (2006.01)
(Continued)

(52) U.S. Cl.
CPC ........... *B01D 35/306* (2013.01); *B01D 29/21* (2013.01); *B01D 35/005* (2013.01);
(Continued)

(58) Field of Classification Search
CPC .. B01D 35/306; B01D 35/147; B01D 35/153; B01D 35/16; B01D 29/21;
(Continued)

(56) References Cited

U.S. PATENT DOCUMENTS 5,589,060 A * 12/1996 Gebert ................. B01D 24/004
210/130
5,695,633 A * 12/1997 Ernst ...................... B01D 29/21
210/130
(Continued)

FOREIGN PATENT DOCUMENTS

DE 19737699 A1 * 8/1997
DE 20118683 3/2003
(Continued)

OTHER PUBLICATIONS

International Search Report, Oct. 25, 2013.

*Primary Examiner* — Thomas M Lithgow
(74) *Attorney, Agent, or Firm* — Greer, Burns & Crain, Ltd.

(57) ABSTRACT

A liquid filter having a housing with a removable screw lid and an interchangeable filter unit, the housing having a discharge channel, wherein a closure valve which when installed is fixed to the housing, is axially adjustable between a closed position when the filter unit is installed and the lid is closed, and an open position when the lid is detached and the filter unit is removed, and wherein releasable coupling elements are provided between the lid or filter unit and the valve. The coupling elements engage to transmit torque and tensile forces, by rotation in the loosening direction of the lid, for as long as a seal of the valve which exerts a braking moment on the valve is located in the sealing seat. The coupling elements disengage when the seal has departed from the sealing seat and the valve is thereby freely rotatable about its longitudinal axis.

27 Claims, 22 Drawing Sheets

(51) Int. Cl.
*B01D 35/147* (2006.01)
*B01D 35/153* (2006.01)
*B01D 29/21* (2006.01)
*B01D 35/00* (2006.01)
*F01M 11/03* (2006.01)

(52) U.S. Cl.
CPC ......... *B01D 35/147* (2013.01); *B01D 35/153* (2013.01); *B01D 35/16* (2013.01); *F01M 11/03* (2013.01); *B01D 2201/4007* (2013.01); *B01D 2201/4023* (2013.01); *B01D 2201/4046* (2013.01); *B01D 2201/4084* (2013.01); *F01M 2011/031* (2013.01)

(58) Field of Classification Search
CPC .... B01D 2201/4007; B01D 2201/4023; B01D 2201/4046; B01D 2201/4084; B01D 35/005; F01M 11/03; F01M 2011/031
See application file for complete search history.

(56) References Cited

U.S. PATENT DOCUMENTS

| | | | | |
|---|---|---|---|---|
| 5,814,215 | A * | 9/1998 | Bruss | B01D 29/15 210/130 |
| 6,569,326 | B1 | 5/2003 | Baumann et al. | |
| 6,685,829 | B1 | 2/2004 | Baumann et al. | |
| 6,811,694 | B2 * | 11/2004 | Jainek | B01D 29/21 210/248 |
| 2003/0168390 | A1 | 9/2003 | Jainek | |
| 2008/0053886 | A1 | 3/2008 | Marshall et al. | |
| 2010/0006493 | A1 | 1/2010 | Maier et al. | |

FOREIGN PATENT DOCUMENTS

| | | |
|---|---|---|
| EP | 1307274 | 3/2005 |
| WO | 2008009324 | 1/2008 |

* cited by examiner

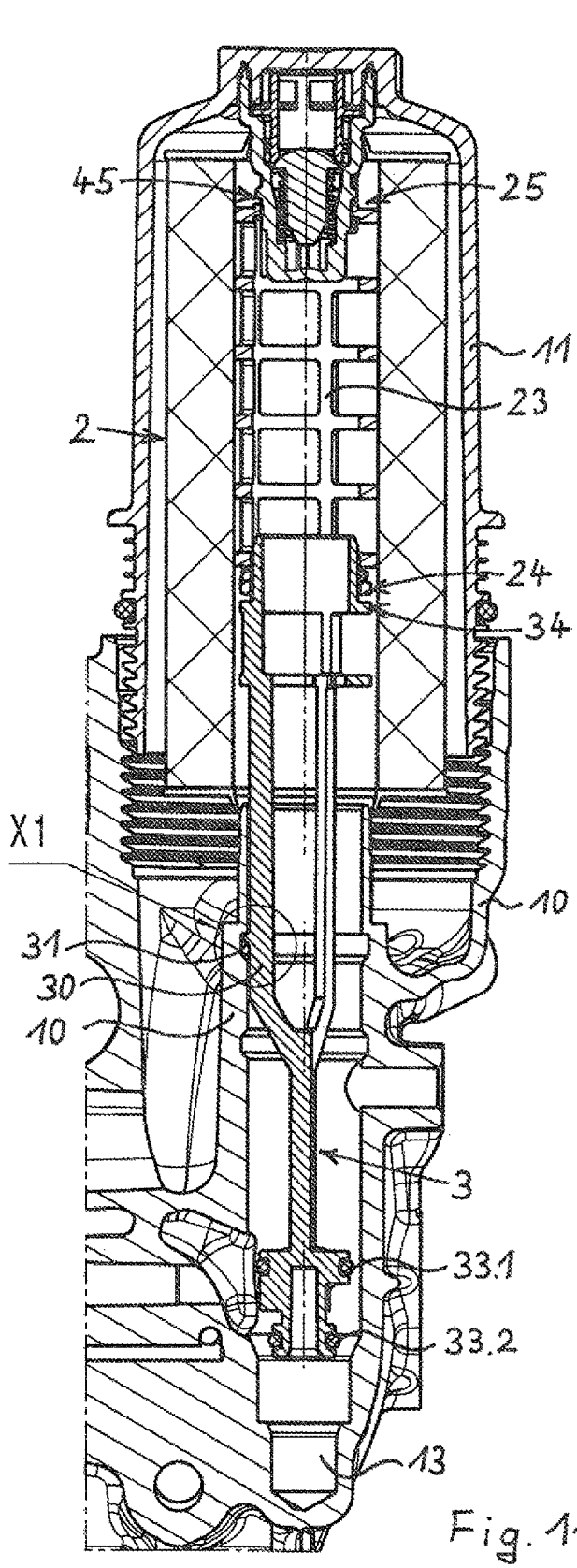
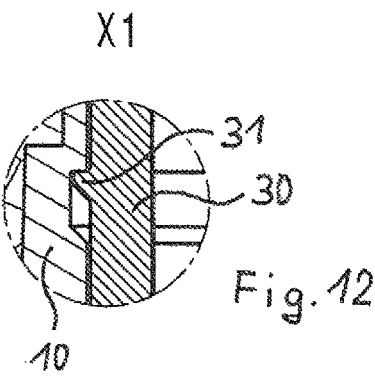
Fig. 11
Fig. 12

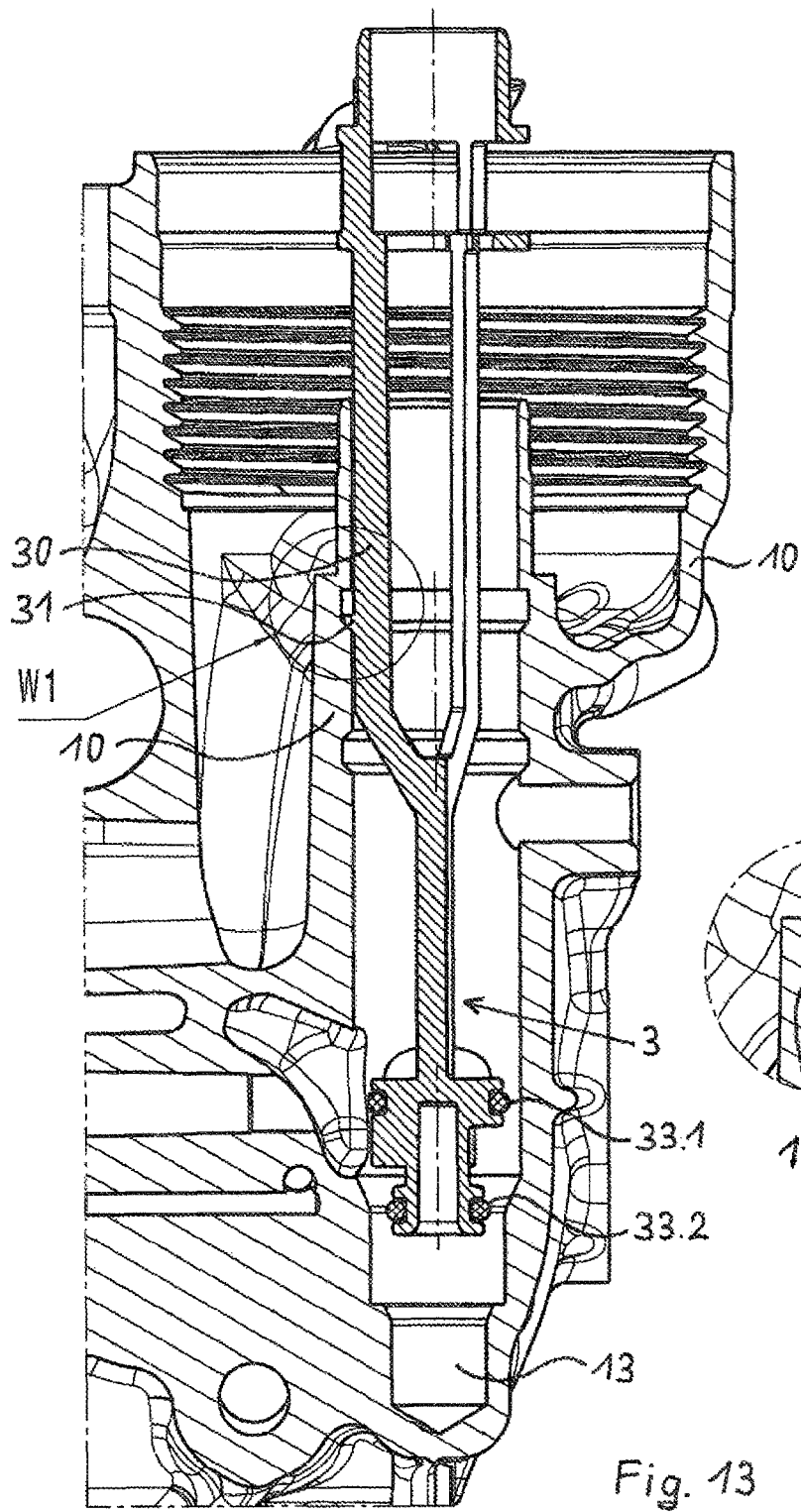
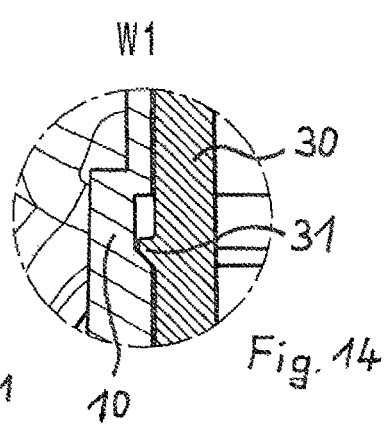
Fig. 14
Fig. 13

LIQUID FILTER WITH A CENTRAL DISCHARGE CHANNEL AND FILTER UNIT FOR A LIQUID FILTER

CROSS-REFERENCES TO RELATED APPLICATIONS

This application claims the benefit of the German patent application No. 102012210900.5 filed on Jun. 26, 2012, the entire disclosures of which are incorporated herein by way of reference.

BACKGROUND OF THE INVENTION

The present invention relates to a liquid filter, in particular an oil filter of an internal combustion engine, having a filter housing having a removable screw cover and having a raw liquid inlet and a clean liquid outlet, having a filter insert that is situated exchangeably in the filter housing and that separates a raw side and a clean side of the liquid filter from one another, the filter housing further having a central discharge duct for emptying the filter housing when the filter insert is removed, a closing pin that is fixed to the housing in the installed state and that has at least one radially sealing seal in a sealing seat in the discharge duct being capable of being axially displaced between a lower, closed position, assumed when the filter insert is installed and the screw cover is closed, and an upper, open position, assumed when the screw cover is removed and the filter insert is removed, and mechanical, releasable coupling elements being provided between the screw cover or filter insert on the one hand and the closing pin on the other hand. Moreover, the present invention relates to a filter insert for a liquid filter.

EP 1 307 274 B1 indicates a liquid filter for cleaning liquids such as lubricant oil, water, or fuel. The liquid filter has a filter housing, a filter element, a supporting body, and a slide valve. In the closed state, the slide valve prevents liquid from being able to flow from the raw side or from the clean side into a liquid discharge duct. As soon as the filter housing is open, the slide valve is moved axially, releasing the liquid discharge duct and making it possible for the filter housing to empty. In this liquid filter, the slide valve is releasably snap-connected to a supporting body that is connected to a housing cover. In this way, the slide valve can be separated from the supporting body. This is advantageous because the separation of the components from one another reduces the level of maintenance required for the liquid filter.

However, in the known liquid filter it has turned out to be disadvantageous that the connecting means by which the slide valve is snap-connected to the supporting body tends to become damaged, in particular to break, during operation. In this way, parts of the connecting means can move to the clean liquid side of the filter, and from there to downstream components, such as, in the case of an oil filter, an internal combustion engine having points that have to be supplied with lubricant, where damage can occur as a consequence. Moreover, during a filter maintenance the connecting means must be separated from one another manually, in particular by exerting adequate tensile force.

SUMMARY OF THE INVENTION

Therefore, an object of the present invention is to create a liquid filter of the type named above, as well as a filter insert, in which a secure operation is ensured without the risk of damage to downstream components, and simple handling is ensured during filter maintenance.

The first part of said object, relating to the liquid filter, is achieved according to the present invention by a liquid filter that is characterized in that through rotation of the screw cover or filter insert in the fastening direction of rotation of the screw cover, the coupling elements enter into an engagement that transmits a torque and a thrust force, through rotation of the screw cover or filter insert in the release direction of rotation of the screw cover, the coupling elements enter into an engagement that transmits a torque and a tensile force, as least as long as the seal is situated in the sealing seat so as to exert a braking moment on the closing pin, and the coupling elements automatically move out of engagement when the seal moves out of the sealing seat, and as a result the closing pin is freely capable of rotation about its longitudinal axis.

The present invention advantageously brings it about that the risks of mechanical damage that go along with a snap connection, in particular the breakage of parts of the connecting means, are reliably avoided, because according to the present invention the coupling elements are brought into and out of engagement relative to one another solely through rotation. Mechanical bending stresses of the individual parts of the coupling elements do not occur. In this way, a reliable operation of the liquid filter, safe against damage, is ensured. In addition, a particularly simple handling is achieved, because the coupling elements automatically separate from one another when the screw cover is screwed off and the filter insert is pulled out, as soon as the closing pin has reached its open position. Advantageously, a laborious manual separation of the coupling elements is no longer required.

In a development of the present invention, it is preferably provided that the coupling elements form a toothing, the teeth of the respective coupling elements pointing in opposite directions in the circumferential direction, and, seen in the circumferential direction, the tooth spacing being in each case greater than the tooth length. The teeth form coupling elements that are on the one hand simple and on the other hand are capable of being loaded. Through the indicated ratio of tooth spacing to tooth length, the teeth on the one side can in each case be axially guided between the teeth of the other side, practically free of forces, and can then be brought into engagement by rotation relative to one another. Conversely, the engagement of the coupling elements can be very easily released by rotation in the opposite direction and axial pulling apart.

In a further specification of the present invention, it is proposed that, regarded in the radial direction, the teeth each have asymmetrical tooth edges, the respectively cooperating tooth edges running at a first angle oblique to the circumferential direction, and the respective other tooth edges running at a second, smaller angle to the circumferential direction, and the backs of the teeth running in the axial direction. Due to the fact that the cooperating tooth edges run at an angle oblique to the circumferential direction, it is achieved that for the one direction of rotation the coupling elements move into engagement as long as a braking moment is exerted on the closing pin, and the coupling elements automatically move out of engagement as soon as the closing pin is capable of rotating freely, because then, as a result of the action of gravity, the teeth of the closing pin automatically slide over the obliquely running contact surfaces along the other teeth cooperating therewith.

In order to ensure the mentioned sliding of the teeth of the cooperating coupling elements, it is preferably provided that the first angle is between 30° and 60°.

The second, smaller angle is preferably equal to or greater than the thread pitch of the screw cover. In this way, it is ensured that when the liquid filter is assembled, an axial twisting and seizing is avoided, which otherwise could occur if the edges of the first teeth, pointing in the axial direction, were to impinge on the edges, pointing in the opposite axial direction, of the other teeth.

In a further embodiment, it is preferably provided that the teeth of the toothings each protrude to diameters that are identical at least in some regions, on the one hand axially downward or radially outward or inward from the screw cover or from the filter insert, and on the other hand correspondingly protrude axially upward or radially inward or outward from the closing pin. The concrete choice of the configuration of the teeth will be made in particular according to the particular space conditions, according to which one configuration or another may be more advantageous.

In a preferred development of the present invention, it is provided that the closing pin is equipped with flexible holding elements that, in the open position of the closing pin, are expanded and hold the closing pin in the discharge duct in the axial direction, and that, when the closing pin goes from its open position into its closed position and vice versa, are capable of being temporarily compressed, then entering into a frictional fit with the filter housing and, in the closing position of the closing pin, again expanding. The flexible holding elements perform two advantageous functions. The one function is to hold the closing pin axially in its opening position, in which its coupling elements are separated from the coupling elements of the filter insert or screw cover, and to ensure an unhindered discharge of liquid. The second function is to exert a braking moment on the closing pin, also after its seal or seals have been removed from their associated seal seats, in order to bring about a further lifting of the closing pin when the screw cover is screwed off from the housing, and to bring the closing pin to a height relative to the filter housing such that the seal or seals of the closing pin have an axial distance from the associated sealing seat or seats that is adequate and that ensures a disturbance-free flow of liquid. The closing pin becomes capable of rotating freely about its longitudinal axis, and can thus automatically be separated from the screw cover or filter insert, only when the flexible holding elements lose their frictional fit to the filter housing in the fully open position of the closing pin.

In order to achieve a compact construction with as few components as possible, it is preferably provided that the filter insert has a central supporting body, and that the coupling elements at the filter insert side are situated at the lower end of the supporting body. In this embodiment, the supporting body is part of the filter insert, and is exchanged along with the filter insert during filter maintenance.

In an alternative embodiment of the liquid filter, it is provided that the closing pin is permanently connected to, or made in one piece with, a supporting body for the filter material body of the filter insert, and that the coupling elements are situated on the one side on the screw cover and on the other side at the top of the supporting body. In this embodiment, the supporting body is a component that remains permanently in the filter housing.

A further embodiment of the liquid filter according to the present invention provides that a filter bypass valve is situated in the screw cover, connected fixedly thereto, and that second mechanical releasable coupling elements are provided between the filter bypass valve or screw cover on the one hand and the filter insert, in particular a support body situated therein, on the other hand. Thus, here a double configuration of cooperating coupling elements is provided in order on the one hand to connect the screw cover and the filter insert to one another and to separate them from one another, and on the other hand to connect the filter insert and the connecting pin to one another and to separate them from one another, in a simple manner as needed in each case.

According to the present invention, it is preferably provided that through rotation of the screw cover in its fastening direction of rotation, the second coupling elements enter into an engagement that transmits a torque and a thrust force, and through rotation of the screw cover in its release direction of rotation, the second coupling elements enter into an engagement that transmits a torque and a tensile force. Thus, the connection and separation of the second coupling elements as well is also kept very simple.

In a further embodiment, it is proposed that the second coupling elements form a toothing, the teeth of the respective coupling elements pointing in opposite directions in the circumferential direction, and, seen in the circumferential direction, the tooth spacing being greater in each case than the tooth length. Through the indicated ratio of tooth spacing to tooth length, in the second coupling elements as well the teeth of the one side can be respectively introduced between the teeth of the other side axially, practically without forces, and then brought into engagement through rotation relative to one another. Conversely, the engagement of the second coupling elements can likewise be separated very easily through rotation in the opposite direction and axial pulling apart.

Differing from the first coupling elements, in the operation of the liquid filter during a maintenance it is advantageous that the filter insert and the screw cover do not automatically detach from one another. For this purpose, the present invention proposes that, seen in the radial direction, the teeth of the second coupling elements each have asymmetrical tooth edges, the respectively cooperating tooth edges running essentially in the circumferential direction, and the respectively other tooth edges running at an angle to the circumferential direction, and the backs of the teeth running in the axial direction. The orientation of the respectively cooperating tooth edges essentially in the circumferential direction excludes a sliding of the teeth of the one side on the teeth of the other side, so that here an undesirable automatic separation of the coupling elements when the screw cover is screwed off is avoided.

Here as well, the angle of the respectively other tooth edges is equal to or greater than the thread pitch of the screw cover, in order to avoid axial twisting or seizing if, when the filter insert and screw cover are brought together, the end surfaces of the teeth pointing toward one another in the axial direction accidentally move into a position opposite one another.

In order to prevent the above-mentioned undesired automatic separation of the screw cover and filter insert even more reliably, the second coupling elements are usefully simultaneously fashioned as snap elements acting in the circumferential direction, whose snap moment is less than a braking moment of the closing pin situated in the closing position. When the screw cover is screwed tight, the first and second coupling elements move out of engagement with regard to the transmission of axial tensile force. When the direction of rotation of the screw cover is reversed, i.e. it is unscrewed, first the second coupling elements, and only after this the first coupling elements, move out of engagement, whereby the above-described desired functional sequence in the maintenance of the filter is ensured.

In order on the one hand to securely accept the forces that are to be transmitted, in particular the axial tensile forces, and to be able to distribute them advantageously, and on the other hand to keep the shaping and production of the parts of the filter insert simple, it is preferably provided that the toothings of the coupling elements each have from two to six, preferably in each case four, teeth distributed around the circumference.

In addition, the present invention relates to a filter insert for a liquid filter, in particular for an oil filter of an internal combustion engine, the filter insert being capable of being installed exchangeably in a filter housing having a removable screw cover and having a raw liquid inlet and a clean liquid outlet, and in the installed state the filter insert separating a raw side and a clean side of the liquid filter from one another, and there being provided on the filter insert mechanical, releasable coupling elements for connecting to coupling elements on a closing pin that is fixed to the filter housing in the installed state, the closing pin being situated in a central discharge duct of the filter housing and being provided with at least one radially sealing seal in a sealing seat in the discharge duct, and the closing pin being capable of axial displacement between a lower closing position, assumed when the filter insert is installed and the screw cover is closed, and an upper position, assumed when the screw cover is removed and the filter insert is removed, for emptying the filter housing when the filter insert is removed.

In order to achieve the second part of the object, relating to the filter insert, a filter insert is proposed that is characterized in that
    through rotation of the screw cover and/or filter insert in the fastening direction of rotation of the screw cover, the coupling elements of the filter insert can be brought into an engagement with the coupling elements of the closing pin that transmits a torque and a thrust force,
    through rotation of the screw cover or filter insert in the release direction of rotation of the screw cover, the coupling elements of the filter insert can be brought into an engagement with the coupling elements of the closing pin that transmits a torque and a tensile force, as long as the seal is situated in the sealing seat so as to exert a braking moment on the closing pin, and
    the coupling elements can be automatically brought out of engagement with the coupling elements of the closing pin when the seal moves out of the sealing seat, and as a result the closing pin is freely capable of rotation about its longitudinal axis.

The filter insert according to the present invention achieves the advantage is already described above in connection with the liquid filter.

Advantageous embodiments and developments of the filter insert according to the present invention are additionally disclosed herein. With regard to the advantages that can be achieved with these embodiments of the filter insert, reference is made to the corresponding parts of the description of the liquid filter.

BRIEF DESCRIPTION OF THE DRAWINGS

In the following, exemplary embodiments of the present invention are explained on the basis of a drawing.

FIGS. 1 through 23 show a first exemplary embodiment of a liquid filter in various representations and in various operating states.

Figure 1:
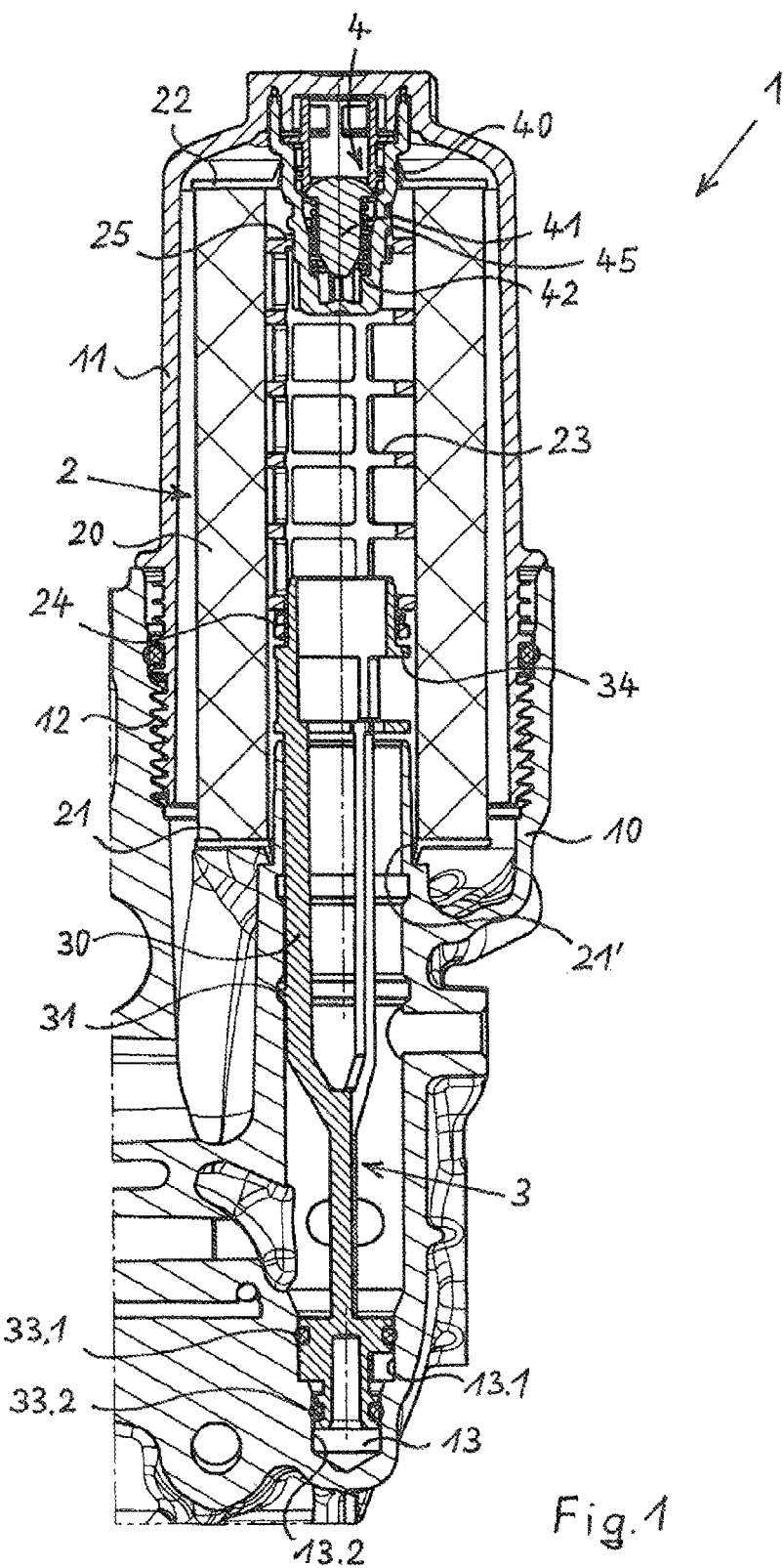

In the following description of the Figures, identical parts are always designated by the same reference characters in the various Figures, so that it is not necessary to explain each reference character anew in each Figure. The signification of the individual reference characters is also indicated in the list of reference characters provided below.

DETAILED DESCRIPTION OF THE PREFERRED EMBODIMENTS

FIG. 1 shows, in longitudinal section, a liquid filter 1 having a filter housing 10, a filter insert 2 situated exchangeably therein, and a screw cover 11. In filter housing 10 there runs a central discharge duct 13 that is used to empty filter housing 10 when there is a change of filter insert 2. In normal operation, discharge duct 13 is closed by a closing pin 3 having two seals 33.1 and 33.2 situated at the lower end of the pin, the seals being situated axially at a distance from one another and having different diameters, and the seals each cooperating in radially sealing fashion with a duct segment 13.1 and 13.2. To open discharge duct 13, closing pin 3 is capable of being moved upward in its axial direction when filter insert 2 is exchanged.

Filter insert 2 is made up of a filter material body 20 enclosed at its lower side by an end disk 21 and at its upper side by an end disc 22. A supporting body 23 in the form of a lattice is situated inside filter insert 2.

At the upper end of closing pin 3, first coupling elements 34 are integrally formed on, which cooperate with first coupling elements 24 on the lower end of supporting body 23, and can enter into and out of engagement therewith.

Further, second coupling elements are provided further above in liquid filter 1, namely second coupling elements 25 at the upper end of supporting body 23, and associated second coupling elements 45 on a valve housing 40 of a filter bypass valve 4 that is fixed to the cover. Inside valve housing 40, a valve body 41, pre-loaded by a spring 42, is guided so as to be capable of axial displacement relative to a valve seat.

In the assembled state of liquid filter 1 shown in FIG. 1, filter insert 2 is placed from above, with its lower end disk 21 and central mounting opening 21' provided therein at the front, onto an upper part of closing pin 3, which there forms a guide segment 30. On its inner circumference, lower end disk 21 is placed in sealing fashion onto a central pipe support that forms a part of filter housing 10.

Figure 2:
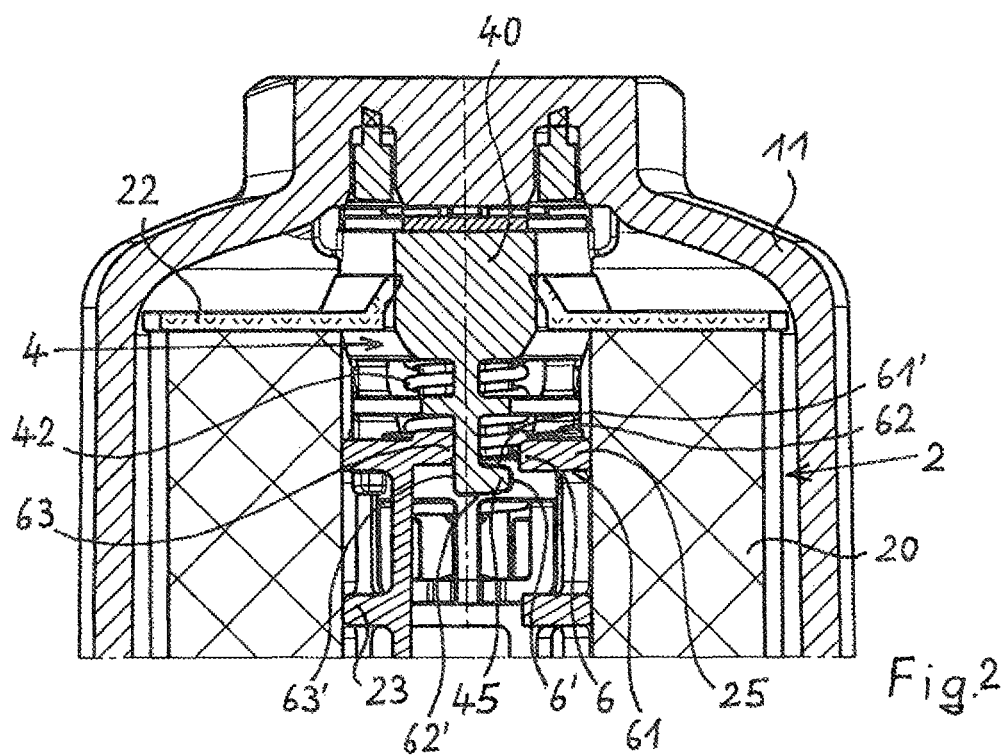

FIG. 2 shows the upper part of liquid filter 1 according to FIG. 1 in an enlarged longitudinal section. On the upper end of support body 23, second coupling elements 25 thereof are integrally formed on, as teeth 6 pointing in the circumferential direction. On valve housing 40, teeth 6' are integrally formed on as second coupling elements 45 oriented in the opposite direction. Teeth 6 and 6' cooperate with one another in the manner of a bayonet closure. Respectively cooperating tooth edges 61 and 61' run essentially in the circumferential direction. The respectively other tooth edges 62 and 62' run at an angle oblique to the circumferential direction, the angle being equal to or greater than the pitch of the screw threading 12 between cover 11 and filter housing 10. In this way, a seizing of coupling elements 25 and 45 is avoided. Tooth backs 63 and 63' each run in the axial direction, and lie against one another in the state shown in FIG. 2. This state results when screw cover 11 is rotated in its fastening direction of rotation. In this state, a torque can be transmitted by screw cover 11 to supporting body 23, but not an axial tensile force.

Figure 3:
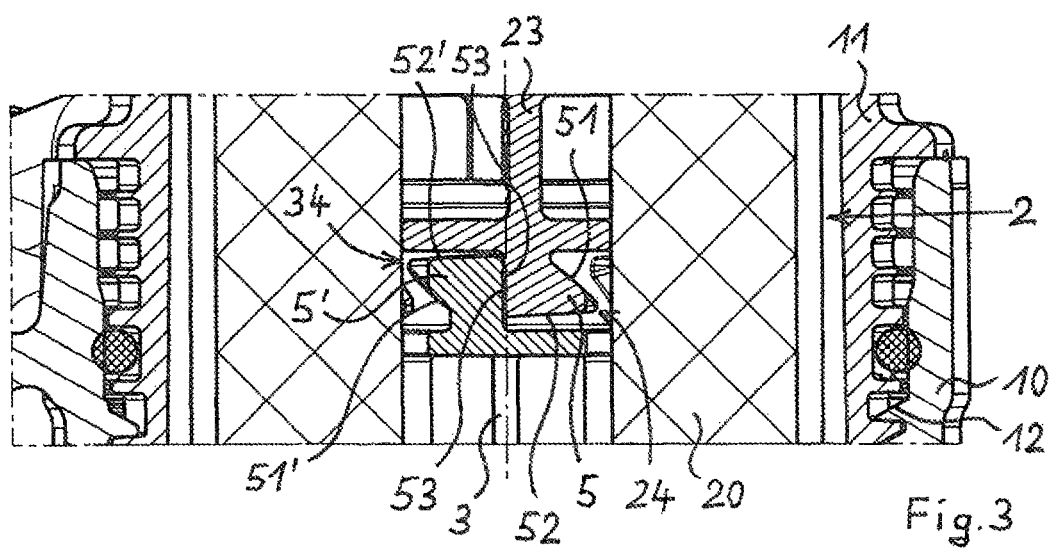

FIG. 3 shows an enlarged sectional view of a region of liquid filter 1, in which first coupling elements 24 and 34 are situated. First coupling elements 24 and 34 are realized in the form of teeth 5, 5' having asymmetrical tooth edges. Upper tooth edges 51 of teeth 5, which form first coupling elements 24, run at an angle of approximately 45° to the circumferential direction. Correspondingly, lower tooth edges 50', of teeth 5' forming coupling elements 34, run at the same angle oblique to the circumferential direction. Lower tooth edges 52 of teeth 5, and upper tooth edges 52' of teeth 5', run at a slightly oblique angle to the circumferential direction, this angle being equal to or greater than the pitch angle of screw threading 12. In the state shown in FIG. 3, which results when screw cover 11 is rotated in the fastening direction of rotation, tooth backs 53 and 53' of teeth 5 and 5' lie against one another, whereby a torque can be transmitted in the fastening direction of rotation of screw cover 11 and an axial thrust force can be transmitted, but not an axial tensile force.

Figure 4:
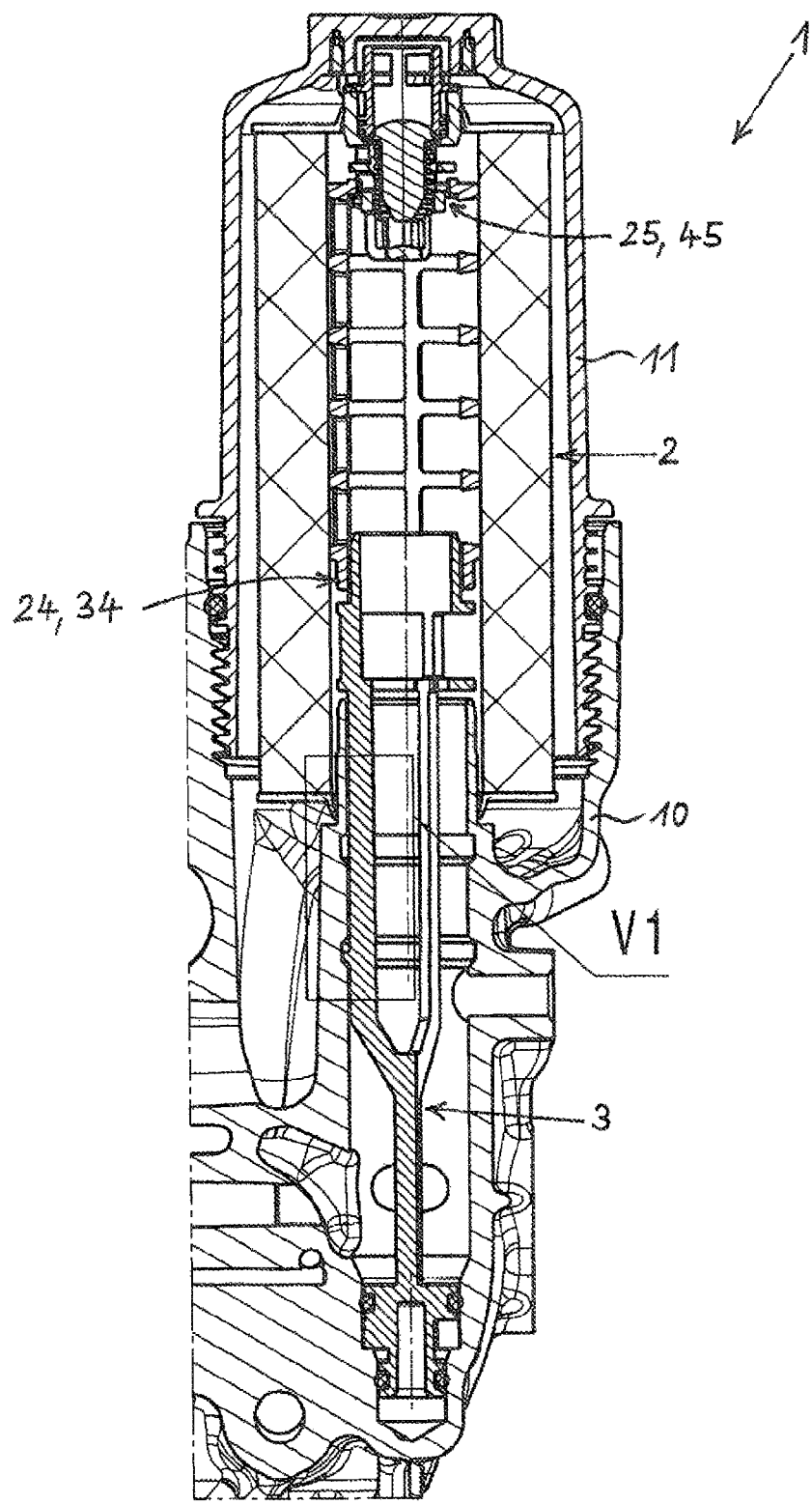

FIG. 4 shows liquid filter 1 in a state that results when screw cover 11 is rotated by a certain angle in the release direction of rotation. In this way, both first coupling elements 24 and 34 and also second coupling elements 25 and 45 enter into an engagement with one another that transmits an axial tensile force.

Figure 5:
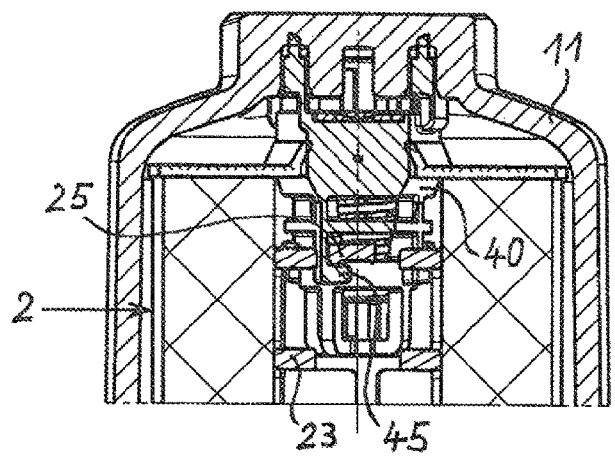

For second coupling elements 25 and 45, this state of engagement, in which axial tensile forces can be transmitted, is shown in FIG. 5.

Figure 6:
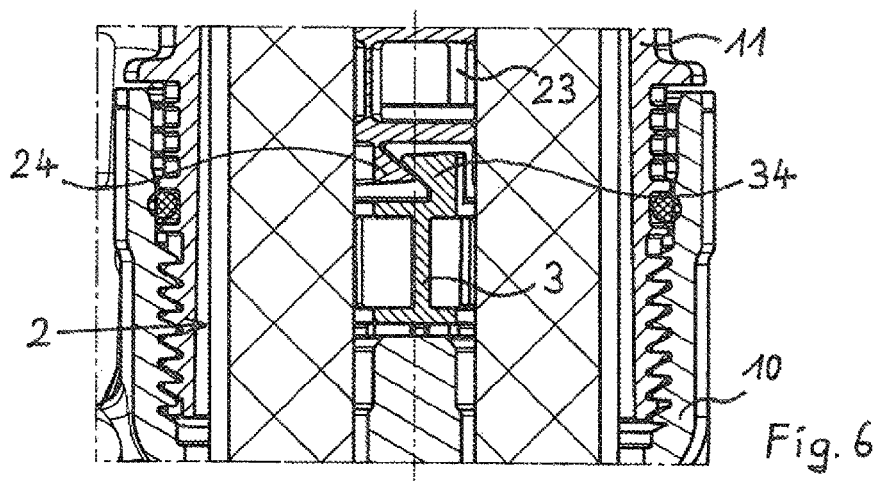

FIG. 6 shows how first coupling elements 24 and 34 enter into their engagement that transmits an axial tensile force.

Figure 7:
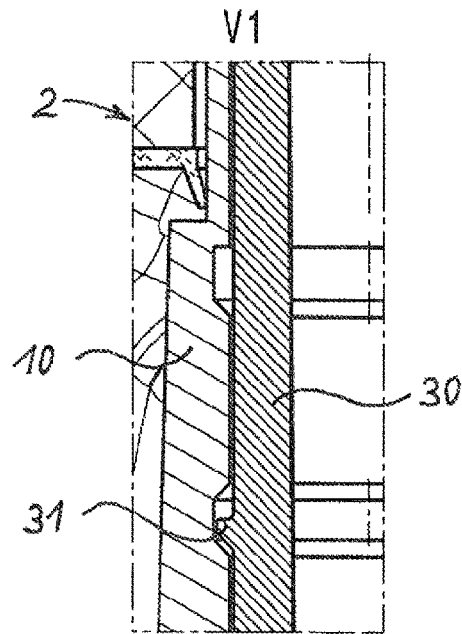

FIG. 7 shows detail V1 from FIG. 4. Here, it can be seen clearly that in this state holding elements 31 on guide segment 30 of closing pin 3 are situated in a circumferential groove of filter housing 10, whereby guide segment 30 is relieved of stress.

Figure 8:
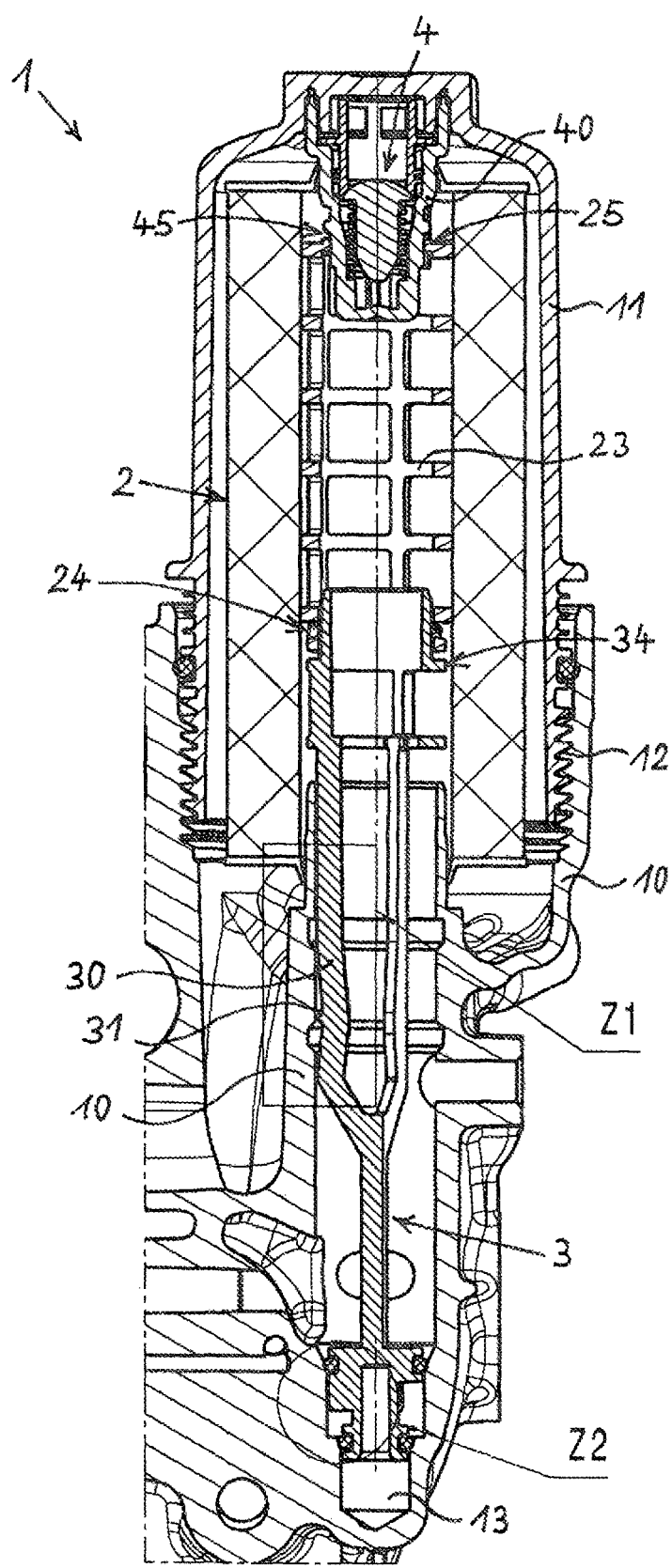

FIG. 8 shows the state of liquid filter 1 after a further releasing rotation of screw cover 11. During the movement of screw cover 11 upward, both supporting body 23 and closing pin 3 are carried along upward by first coupling elements 24 and 34 and second coupling elements 25 and 45, which are engaged with one another. Here, holding elements 31 move into a region of filter housing 10 that does not have a groove, whereby guide segment 30 is placed under tension by holding elements 31, and experiences a braking moment relative to filter housing 10.

Figure 9:
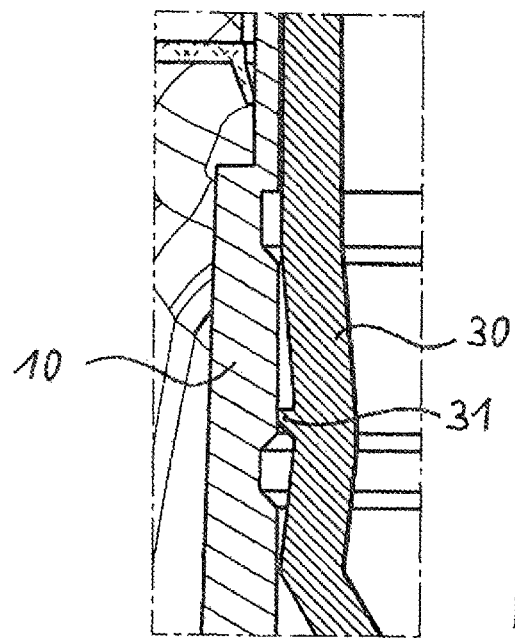

FIG. 9 shows an enlarged view of detail Z1 from FIG. 8. Here, the warping of guide segment 30 can be seen, because holding element 31 is situated above the groove of filter housing 10 that first receives this element, resulting in friction.

Figure 10:
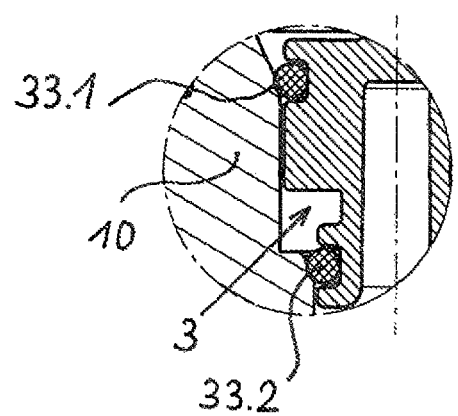

FIG. 10 shows the position of the lower end of closing pin 3 in discharge duct 13. Seals 33.1 and 33.2 are just leaving their sealing seat, so that a friction previously produced by seals 33.1 and 33.2 is ceasing. In the present example, this friction is replaced by the friction of holding elements 31 on filter housing 10.

FIG. 11 shows liquid filter 1 after still further rotation of screw cover 11 out of filter housing 10. In this way, closing pin 3 is lifted far enough that its holding elements 31 have now moved into a second, upper groove in filter housing 10, so that now guide segment 30 of closing pin 3 is again relieved of stress, and no braking moment is exerted on closing pin 3. Thus, closing pin 3 is now capable of rotating freely about its longitudinal center axis.

FIG. 12 shows detail X1 from FIG. 11, in an enlarged view. Here, it can be seen how holding element 31 of guide segment 30 is situated free of tension in the upper groove of filter housing 10.

Because closing pin 3 is now capable of rotating freely in the circumferential direction, gravity causes coupling elements 24 and 34 to automatically detach from one another, because automatic sliding over oblique tooth edges 51 and 51' takes place. Thus, the unit made up of screw cover 11, filter insert 2, and supporting body 23 on the one hand is then separated from the rest of the liquid filter on the other hand.

After removing screw cover 11 and filter insert 2, the state shown in FIG. 13 results. Closing pin 3 is held axially in its raised position by its holding elements 31, so that discharge duct 13 now remains open.

FIG. 14 shows detail W1 from FIG. 13, again in an enlarged view.

Figure 15:
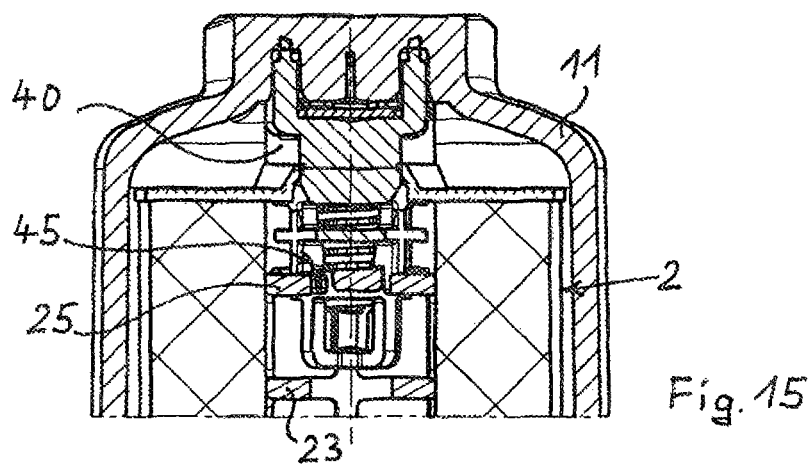
Figure 16:
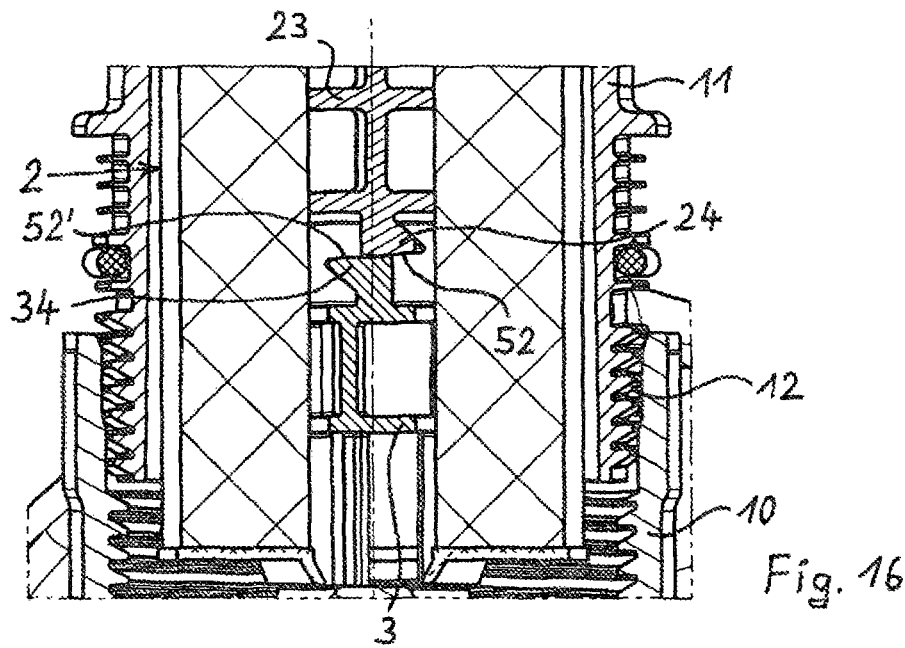
Figure 17:
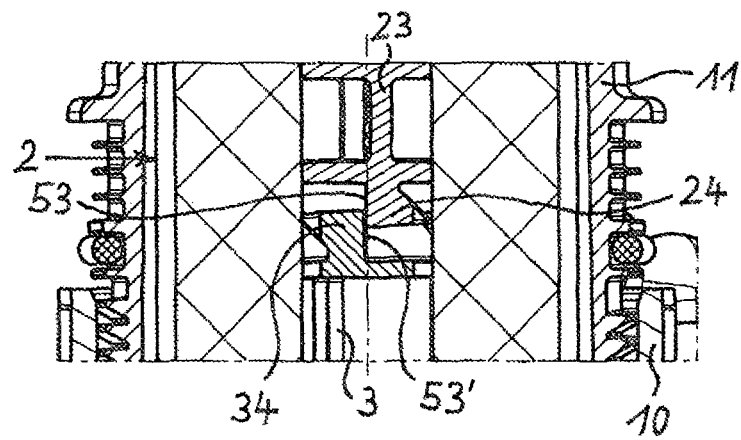

FIGS. 15 through 17 illustrate the assembly of liquid filter 1 after a maintenance session, second coupling elements 25 and 45 according to FIG. 15 and first coupling elements 24 and 34 according to FIGS. 16 and 17 gradually moving into an engagement that transmits a torque and an axial thrust force, but that does not transmit an axial tensile force.

Figure 18:
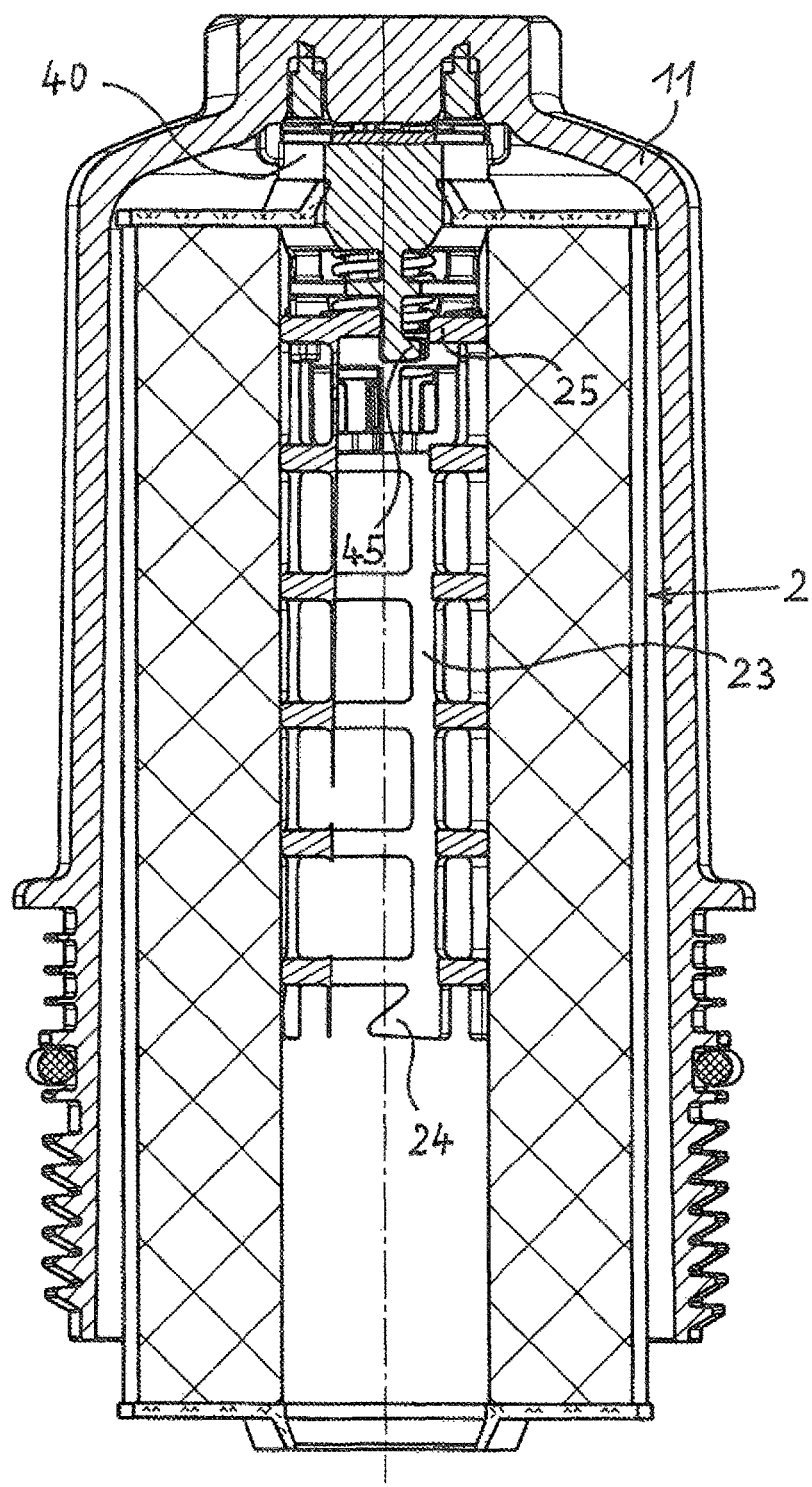

FIG. 18 shows a unit made up of screw cover 11 and filter insert 2 with support body 23. Support body 23 is brought, by second coupling elements 21, into an engagement with second coupling elements 45 on valve housing 40 that transmits a torque and an axial thrust force, this engagement resulting when screw cover 11 is rotated in its fastening direction of rotation. First coupling elements 24 are visible at the lower end of support body 23.

Figure 19:
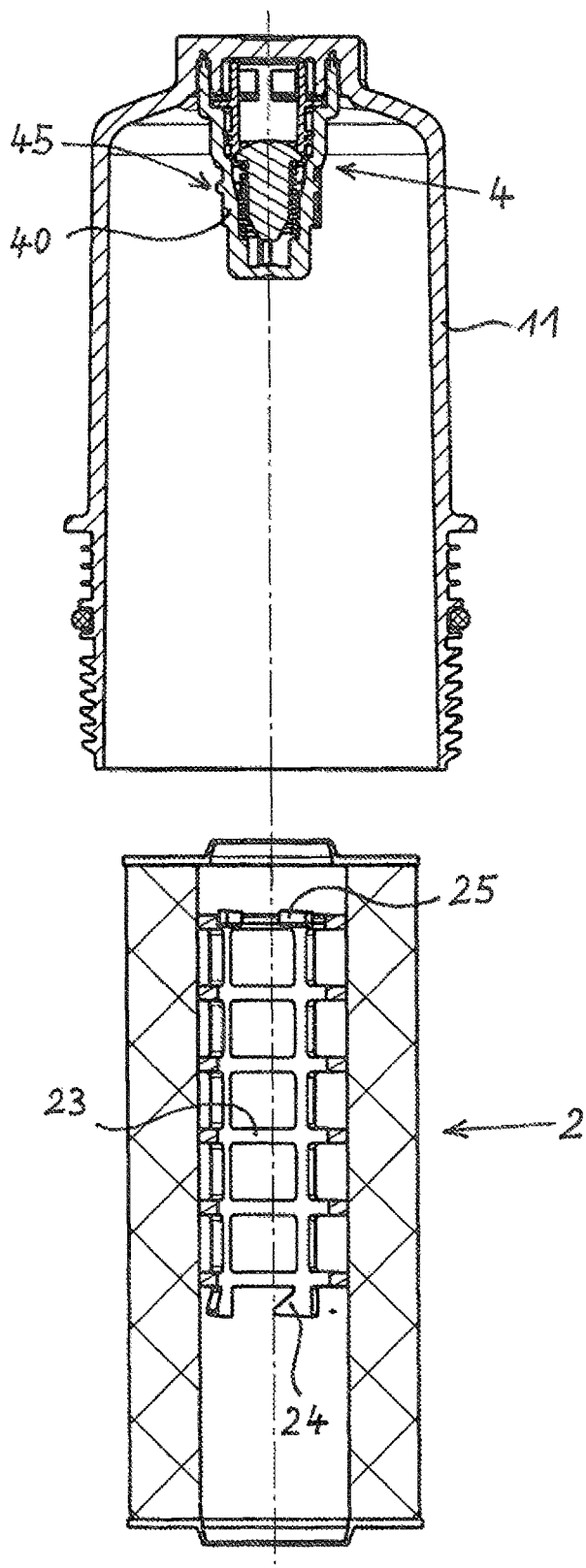

FIG. 19 shows screw cover 11 with filter bypass valve 4 fixed thereon on the one hand, and filter insert 2 with support body 23 situated therein on the other hand, as separated individual parts. Second coupling elements 45 are situated on the outer circumference of valve housing 40. On the upper end of support body 23 second coupling elements 25 are visible, and on the lower end of support body 23 first coupling elements 24 are visible.

Figure 20:
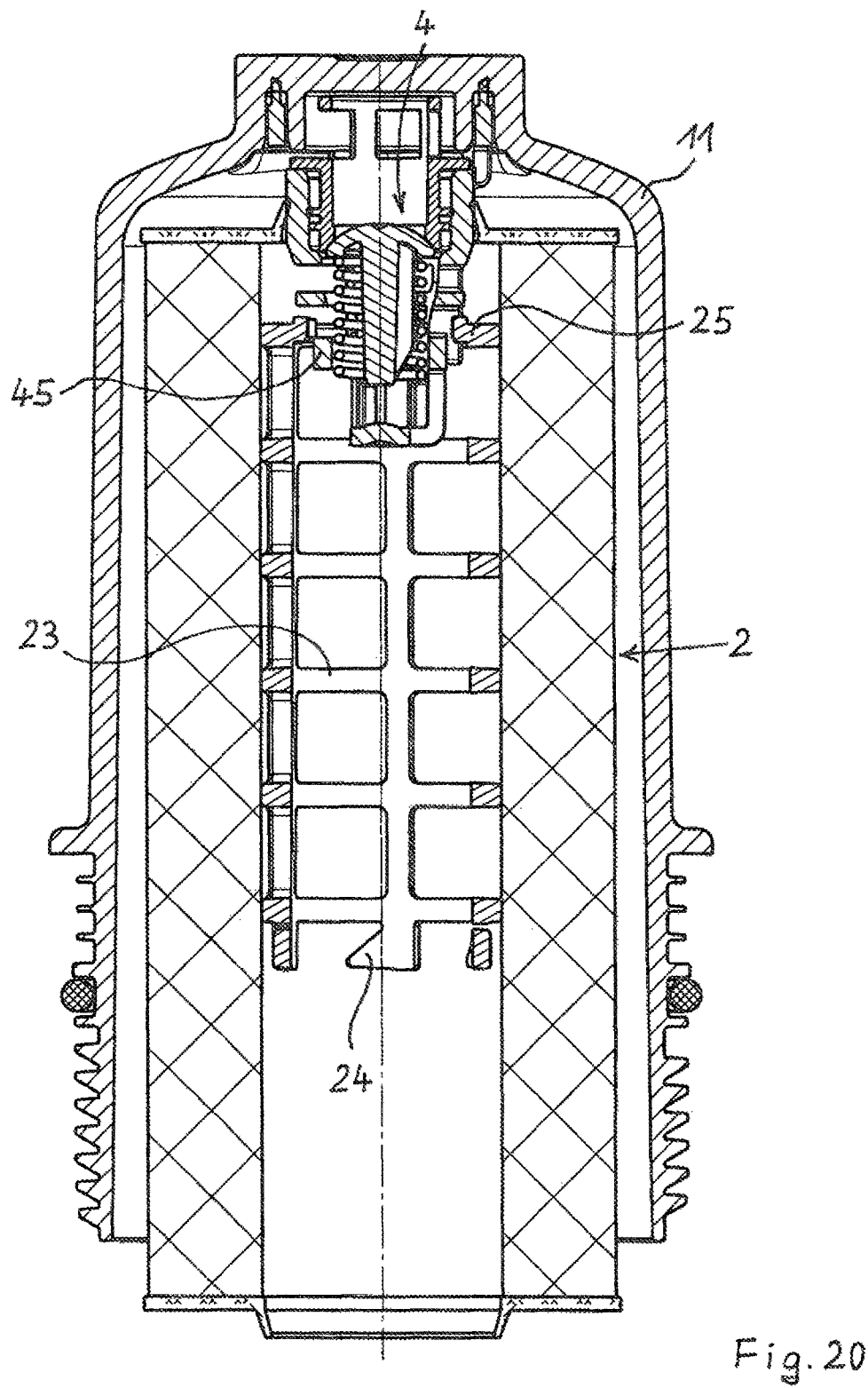

In FIG. 20, filter insert 2, together with support body 23, is placed into screw cover 11, and via second coupling elements 25 and 45 the two parts are now connected to one another for common attachment to filter housing 10.

Figure 21:
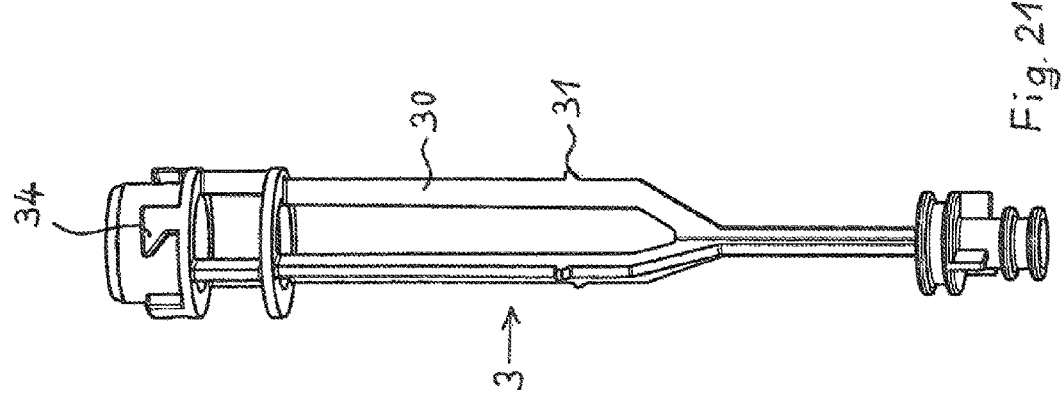
Figure 24:
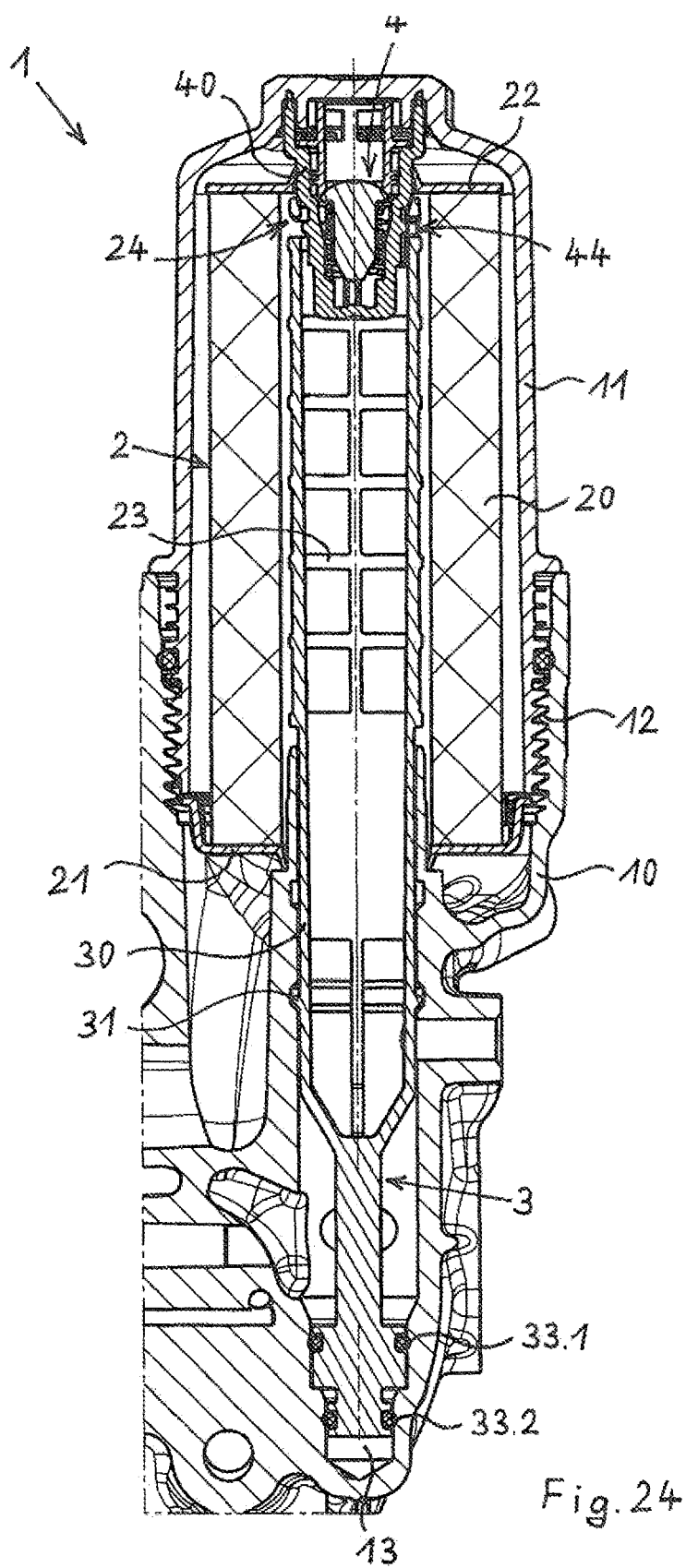
FIGS. 24 through 32 show a second exemplary embodiment of the liquid filter, also in various representations and in various operating states.

FIG. 21 shows a view of closing pin 3 as an individual part, on which first coupling elements 34 are visible at the top. In a lower region of guide segment 30, lug-shaped holding elements 31 are situated. At the bottom, closing pin 3 is realized having two grooves at an axial distance from one another, for accommodating the sealing rings (not shown here).

Figure 22:
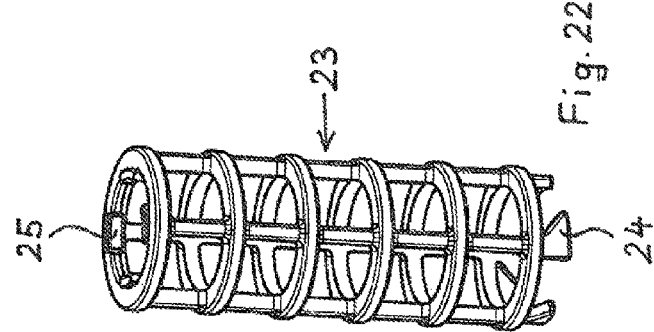

FIG. 22 shows a view of supporting body 23 as an individual part, having first coupling elements 24 at the bottom and having second coupling elements 25 at the top.

Figure 23:
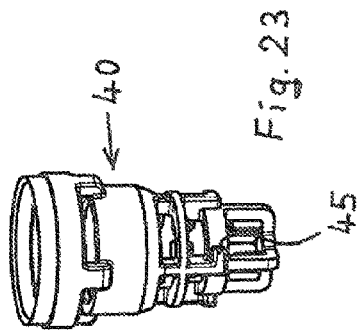

FIG. 23 shows valve housing 40 on which second coupling elements 45 are situated.

FIGS. 24 through 32 show a second exemplary embodiment of liquid filter 1 according to the present invention. The second exemplary embodiment differs from the first exemplary embodiment in that now closing pin 3 is realized in one piece with supporting body 23, whereby supporting body 23 becomes a component permanently remaining in filter housing 10, and is no longer part of exchangeable filter insert 2.

Due to the uniting of closing pin 3 and support body 23 to form a one-piece component, now only one pair of cooperating coupling elements 24 and 44 is further required, which here are situated on the one hand on the upper end of support body 23 and on the other hand on valve housing 40.

In the rest of its construction and in its further functions, liquid filter 1 agrees with the exemplary embodiment already explained above, to whose description reference is made.

Figure 25:
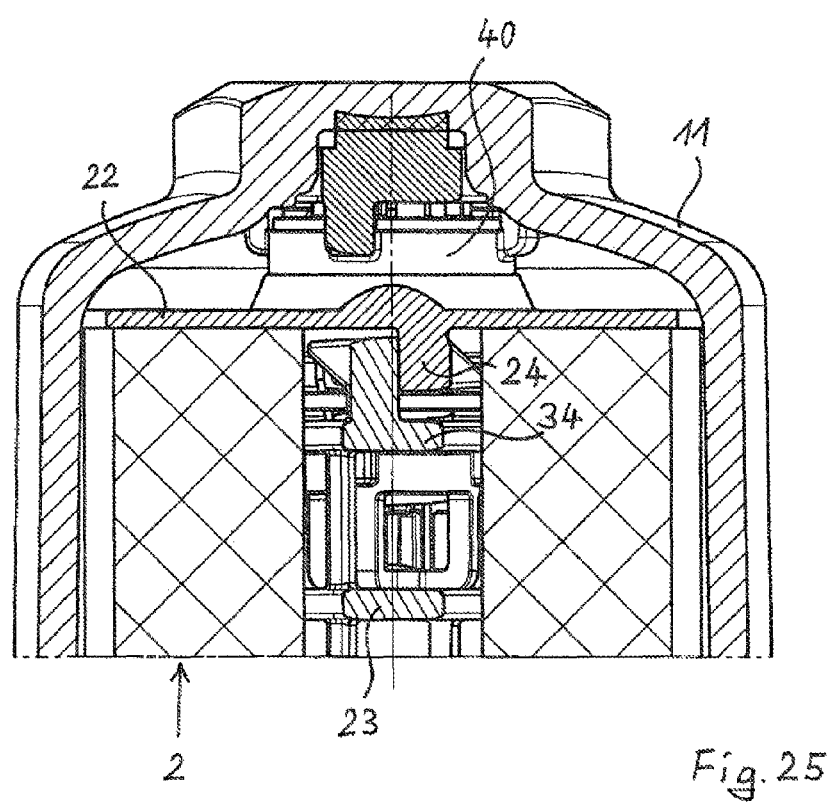
Figure 26:
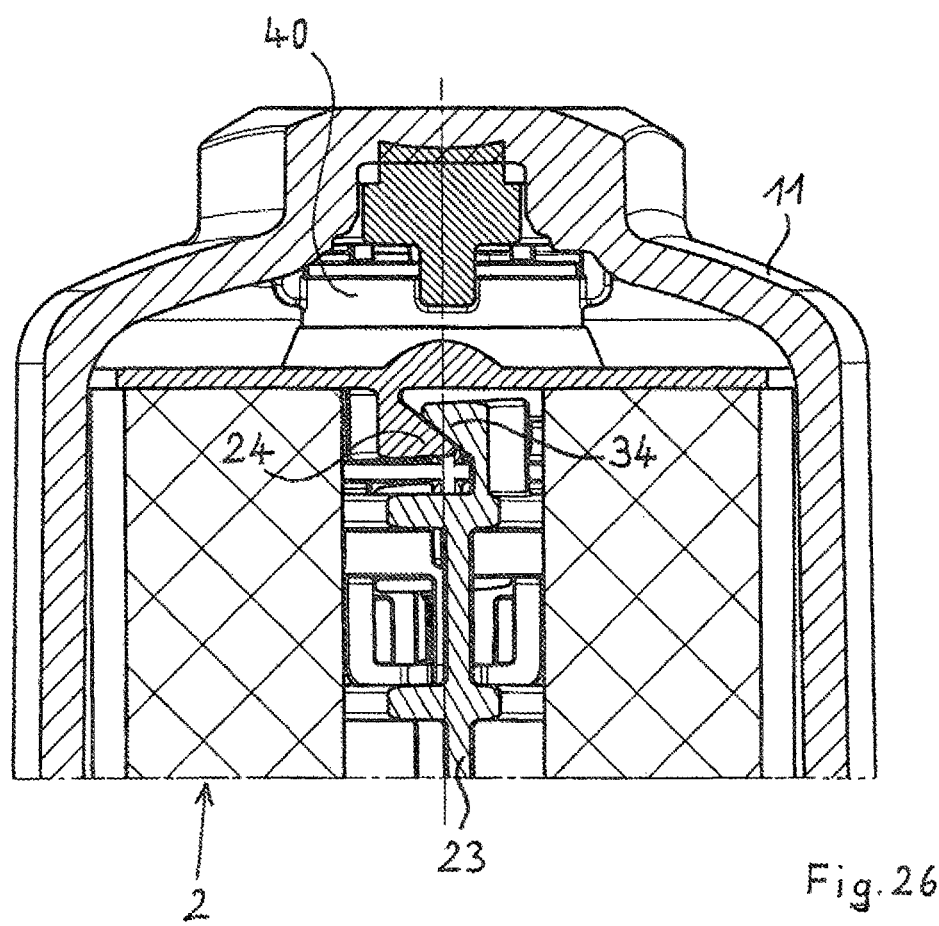
Figure 27:
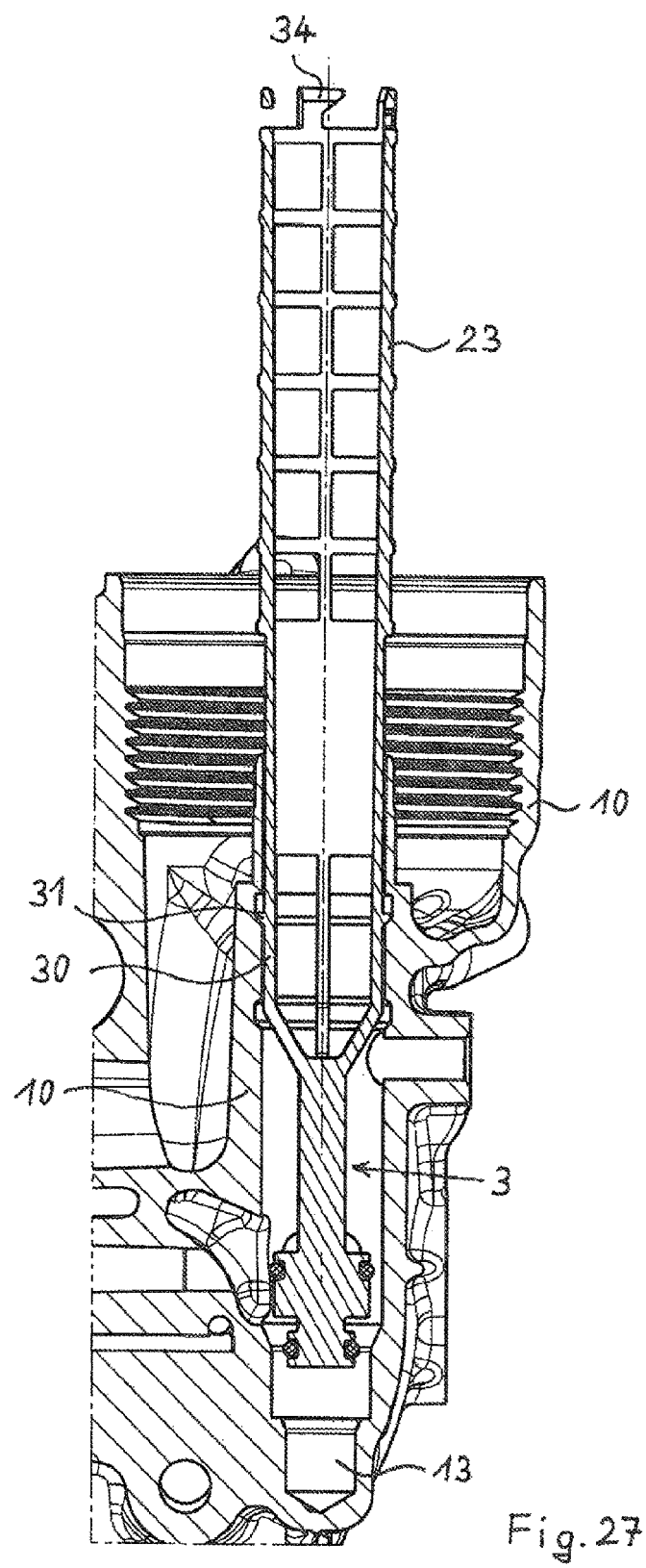
Figure 28:
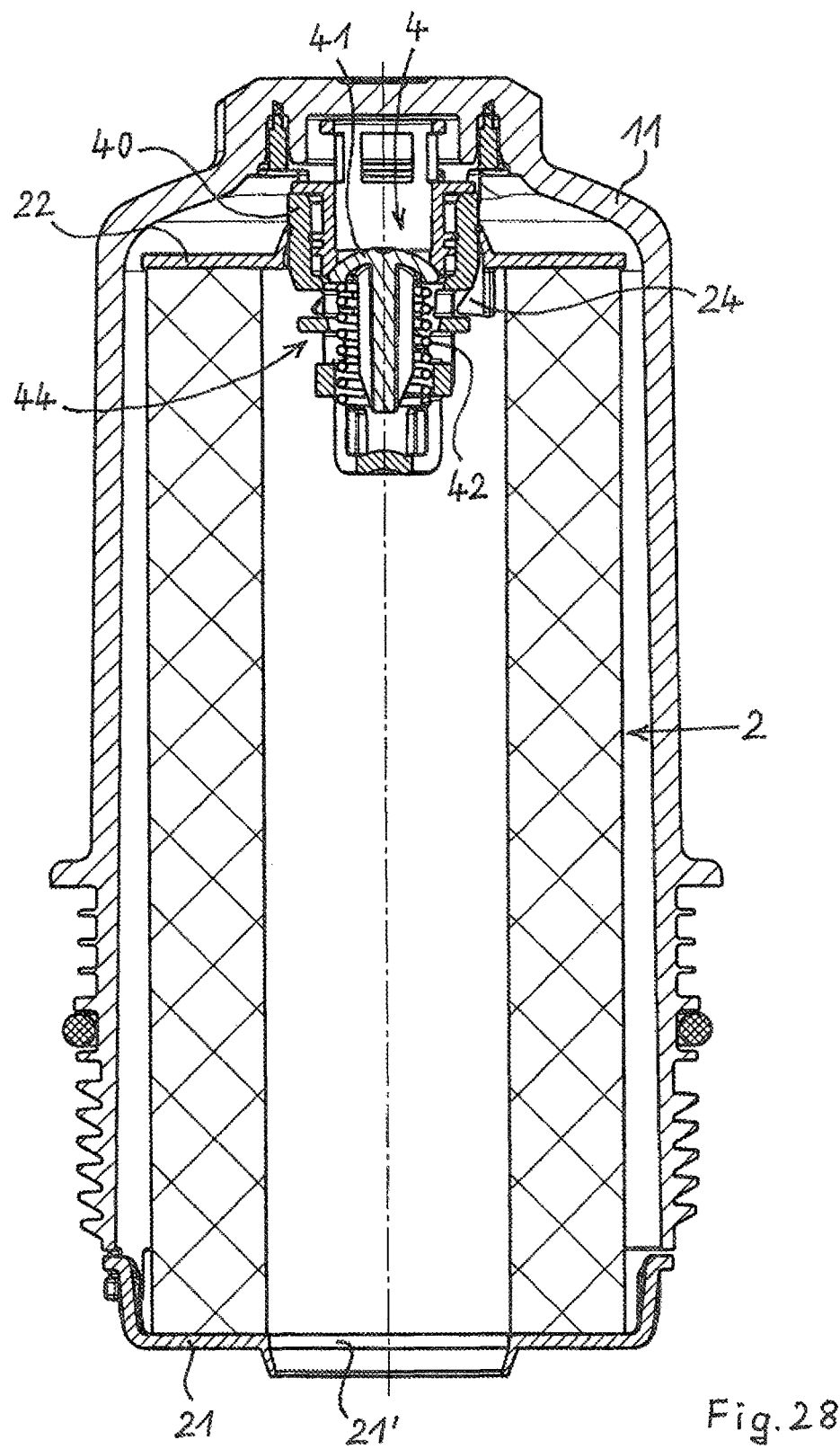
Figure 29:
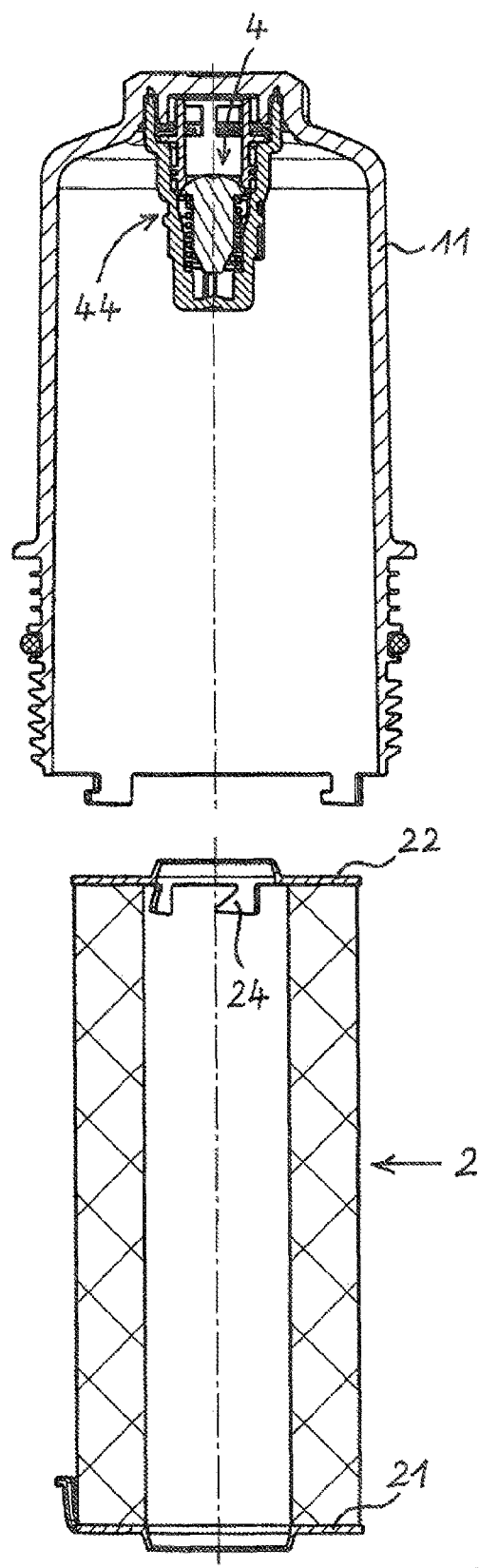
Figure 30:
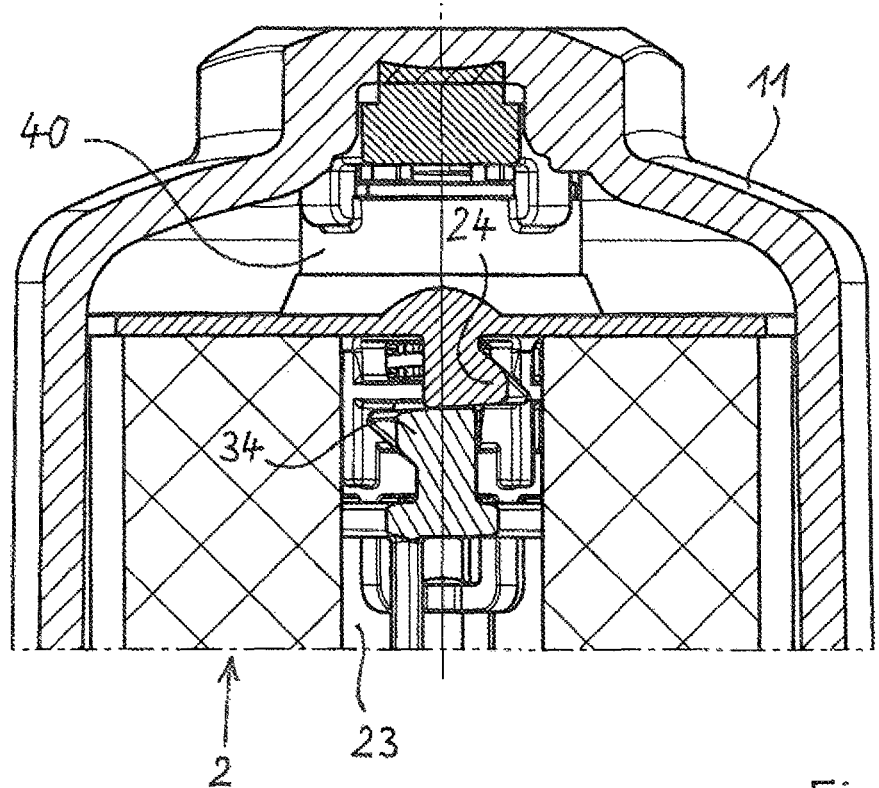
Figure 31:
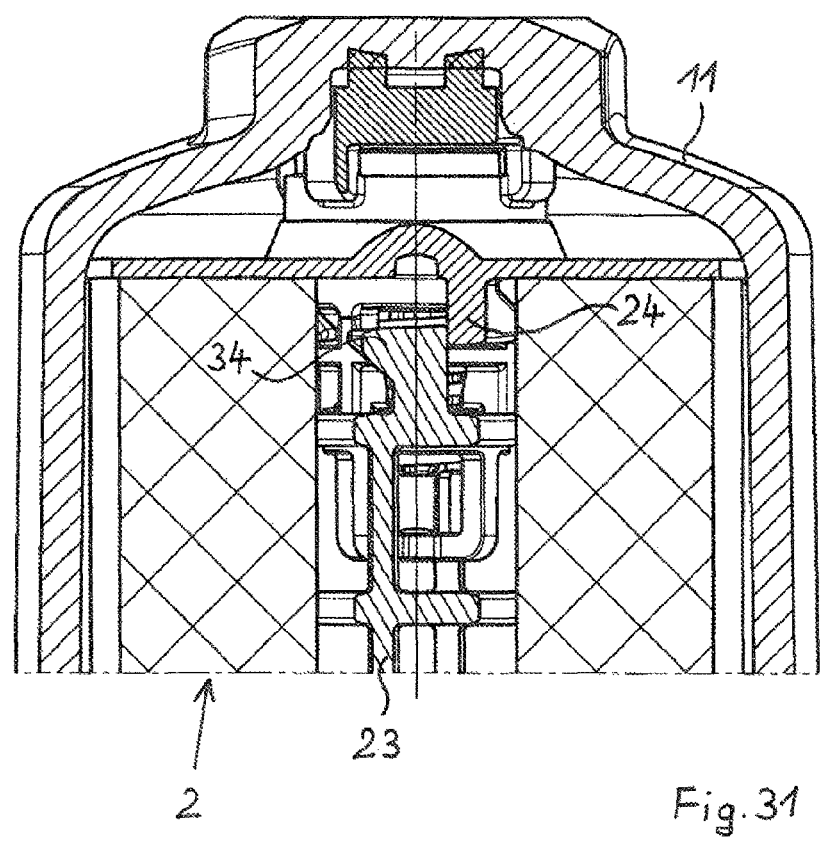

According to FIGS. 25 and 26, in the second exemplary embodiment it is also the case that coupling elements 24 can be integrally formed on the underside of upper end disk 22 of filter insert 2, and coupling elements 34 can be integrally formed on the upper end of support body 23. Upper end disk 23 of filter insert 2 is here connected with a clamping seating to valve housing 40, by being inserted on. Coupling elements 24 and 34 correspond, in their design and function, to first coupling elements explained in relation to the first exemplary embodiment; therefore, when screw cover 11 is screwed tight, these coupling elements enter into an engagement that transmits a torque and an axial thrust force, and when screw cover 11 is unscrewed, they enter into an engagement that transmits a torque and an axial tensile force, as long as a braking moment is exerted on closing pin 3 by its seals 33.1 and 33.2 in discharge duct 13, and/or by holding elements 31 in filter housing 10; as soon as the brake moment acting on closing pin 3 ceases, because closing pin 3 has reached its maximum height upward in the direction in which it is pulled, coupling elements 24 and 34 automatically separate from one another as described above.

Figure 32:
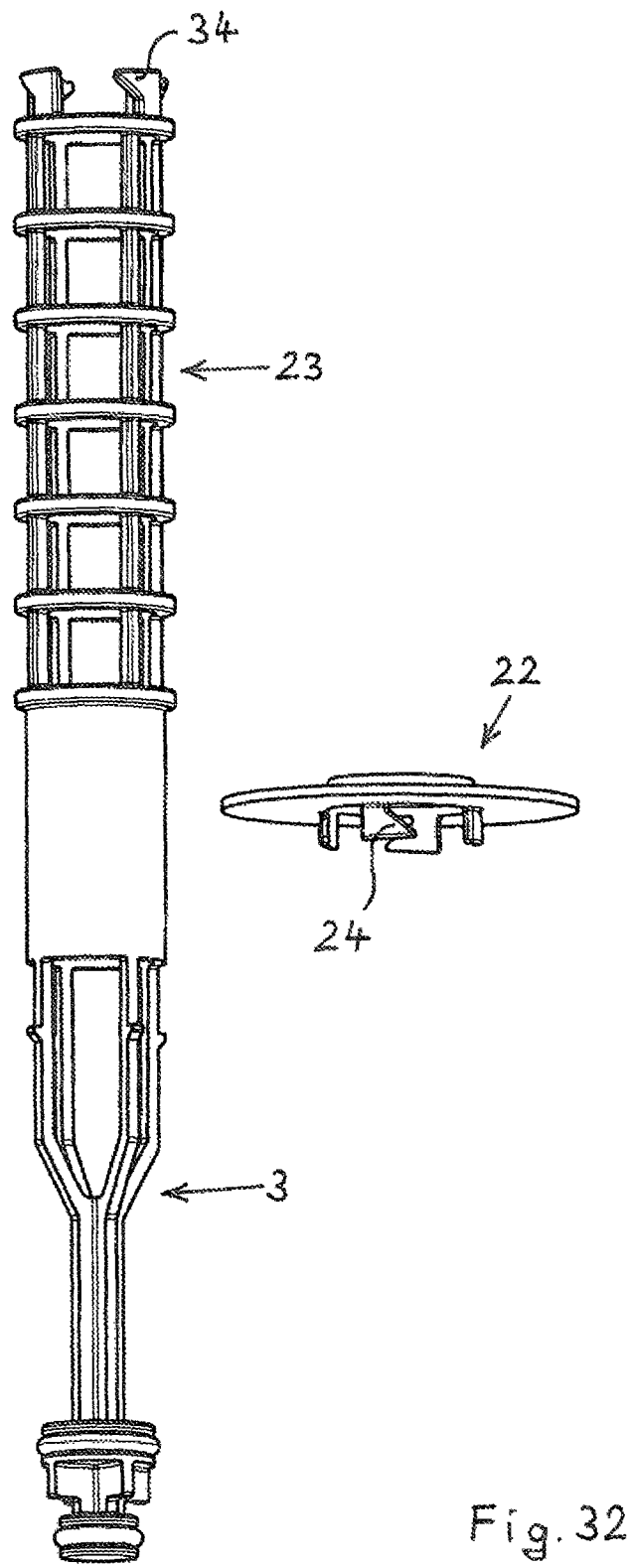

These functions, and the cooperation of the various coupling elements 24, 34, and 44 in the second exemplary embodiment, are further illustrated in the further FIGS. 28 through 32, in various operating states in further sectional representations, and, in FIG. 32, in a view of closing pin 3 and upper end disk 22.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE CHARACTERS 1 liquid filter overall
10 filter housing
11 screw cover
12 screw threading
13 discharge duct
13.1, 13.2 segments of 13
2 filter insert
20 filter material body
21 lower end disk
21' central mounting opening in 21
22 upper end disk
23 support body in 20
24 first coupling elements on 2
25 second coupling elements on 2
3 connecting pin
30 guide segment in 13
31 holding elements
33.1, 33.2 seal(s) on 3
34 first coupling elements on 3
4 filter bypass valve
40 valve housing
41 valve body
42 valve spring
44 first coupling elements on 4
45 second coupling elements on 4
5, 5' teeth of 24, 34
51, 51' oblique tooth edges
52, 52' tooth edges in the circumferential direction
53, 53' tooth backs
6 teeth of 25, 45
61, 61' first tooth edges in circumferential direction
62, 62' second tooth edges in circumferential direction
63, 63' tooth backs

The invention claimed is:

1. A liquid filter comprising:
a filter housing having a removable screw cover, a raw liquid inlet and a clean liquid outlet,
a filter insert situated exchangeably in the filter housing and separating a raw side and a clean side of the liquid filter from one another,
the filter housing further having a central discharge duct for emptying the filter housing when the filter insert is removed,
a closing pin that is fixed to the housing in an installed state and that has at least one radially sealing seal in a sealing seat in the discharge duct being capable of being axially displaced between a lower, closed position, assumed when the filter insert is installed and the screw cover is closed, and an upper, open position, assumed when the screw cover is removed and the filter insert is removed, and
mechanical, releasable coupling elements located on at least one of the screw cover or the filter insert and on the closing pin,
the coupling elements on the closing pin and corresponding coupling elements on at least one of the screw cover or the filter insert being configured to enter into an engagement that transmits a torque and a thrust force upon the closing pin through a fastening direction of rotation of the screw cover, the coupling elements on the closing pin and corresponding coupling elements on at least one of the screw cover or the filter insert being configured to enter into an engagement that transmits a torque and a tensile force upon the closing pin through a release direction of rotation of the screw cover, as least as long as the seal is situated in the sealing seat so as to exert a braking moment on the closing pin, and
the coupling elements on the closing pin and corresponding coupling elements on at least one of the screw cover or the filter insert being configured to automatically move out of engagement when the seal is moved out of the sealing seat, and as a result, the closing pin is freely capable of rotation about its longitudinal axis.

2. The liquid filter as recited in claim 1, wherein the coupling elements on the closing pin and the coupling elements on at least one of the screw cover or the filter insert form a toothing, the teeth of the respective coupling elements being oriented in opposite directions in the circumferential direction, and, seen in the circumferential direction, a tooth spacing being greater in each case than a length of the tooth.

3. The liquid filter as recited in claim 2, wherein, regarded in the radial direction, the teeth each have asymmetrical tooth edges, the respectively cooperating tooth edges running at a first angle oblique to the circumferential direction, and the respective other tooth edges running at a second, smaller angle to the circumferential direction, and the tooth backs running in the axial direction.

4. The liquid filter as recited in claim 3, wherein the first angle is between 30° and 60°.

5. The liquid filter as recited in claim 3, wherein the second angle is equal to or greater than the thread pitch of the screw cover.

6. The liquid filter as recited in claim 2, wherein the teeth of the toothings each protrude from at least one of the screw cover or the filter insert to an extent sufficient to engage with the teeth of the toothings protruding from the closing pin.

7. The liquid filter as recited in claim 1, wherein the closing pin is equipped with flexible holding elements that, in the open position of the closing pin, are expanded and hold the closing pin in the discharge duct in the axial direction, and wherein, when the closing pin goes from its open position into its closed position and vice versa, are capable of being temporarily compressed, entering into a frictional fit with the filter housing and, in the closing position of the closing pin, again expanding.

8. The liquid filter as recited in claim 1, wherein the filter insert has a central support body, and that the coupling elements on the filter insert are situated on a lower end of the support body.

9. The liquid filter as recited in claim 1, wherein the closing pin is one of permanently connected to, or made in one piece with, a support body for the filter material body of the filter insert, and wherein the coupling elements are on one side situated at the top on the support body and on an other side are situated on the screw cover.

10. The liquid filter as recited in claim 1, wherein a filter bypass valve fixed to the screw cover is situated in the screw cover, and wherein second mechanical releasable coupling elements are located between at least one of the filter bypass valve or the screw cover and a support body situated in the filter insert.

11. The liquid filter as recited in claim 10, wherein the second mechanical releasable coupling elements located between at least one of the filter bypass valve or the screw cover and the support body situated in the filter element being configured to enter into an engagement that transmits a torque and a thrust force through a fastening direction rotation of the screw cover, and the second mechanical releasable coupling elements located between at least one of the filter bypass valve or the screw cover and the support body situated in the filter element being configured to enter into an engagement that transmits a torque and a tensile force through a release direction rotation of the screw cover.

12. The liquid filter as recited in claim 11, wherein the second coupling elements form a toothing, the teeth of the respective coupling elements being oriented in opposite directions in the circumferential direction, and, seen in the circumferential direction, the tooth spacing being in each case greater than a length of the tooth.

13. The liquid filter as recited in claim 11, wherein, seen in the radial direction, the teeth of the second coupling elements each have asymmetrical tooth edges, the respectively cooperating tooth edges running essentially in the circumferential direction, and the respectively other tooth edges running at an angle to the circumferential direction, and the tooth backs running in the axial direction.

14. The liquid filter as recited in claim 13, wherein the angle is equal to or greater than the thread pitch of the screw cover.

15. The liquid filter as recited in claim 10, wherein the second coupling elements are simultaneously fashioned as snap elements acting in the circumferential direction, whose snap moment is less than a braking moment of the closing pin situated in the closing position.

16. The liquid filter as recited in claim 2, wherein the toothings of the coupling elements each have two to six teeth distributed around the circumference.

17. A filter insert for a liquid filter, the filter insert being configured to be installed exchangeably in a filter housing having a removable screw cover and in the installed state the filter insert separating a raw side and a clean side of the liquid filter from one another, and there being provided on the filter insert mechanical, releasable coupling elements for connection to coupling elements on a closing pin that is fixed to the filter housing in the installed state,
wherein through rotation of the filter insert in a first direction of rotation, the coupling elements of the filter insert can be brought into an engagement with the coupling elements of the closing pin that transmits a torque and a thrust force,
wherein through rotation of the filter insert in a second, opposite direction of rotation, the coupling elements of the filter insert can be brought into an engagement with the coupling elements of the closing pin that transmits a torque and a tensile force, and
wherein through further rotation of the filter insert in said second direction past the point of engagement of said coupling elements, the coupling elements of the filter insert can automatically be brought out of engagement with the coupling elements of the closing pin, and
wherein the coupling elements of the filter insert and the closing pin form a toothing, the teeth of the coupling elements being oriented in the circumferential direction, and, seen in the circumferential direction, the tooth spacing being greater than a length of the tooth.

18. The filter insert as recited in claim 17, wherein, regarded in the radial direction, the teeth have asymmetrical tooth edges, in each case the one tooth edge running at a first angle oblique to the circumferential direction, and the other tooth edge running at a second, smaller angle to the circumferential direction, and the tooth backs running in the axial direction.

19. The filter insert as recited in claim 18, wherein the first angle is between 30° and 60°.

20. The filter insert as recited in claim 18, wherein the second angle is equal to or greater than the thread pitch of the screw cover.

21. The filter insert as recited in claim 17, wherein the teeth of the toothing at the filter insert side protrude axially downward or radially outward or radially inward from the filter insert.

22. The filter insert as recited in claim 17, further comprising a central support body, and wherein the coupling elements at the filter insert side are situated on the lower end of the support body.

23. The filter insert as recited in claim 17, wherein at the top on the filter insert, on a support body situated therein, there are provided two mechanical releasable coupling elements configured for coupling with second coupling elements on a filter bypass valve that is situated in the screw cover.

24. The filter insert as recited in claim 23, wherein the second coupling elements of the filter insert form a toothing having teeth oriented in the circumferential direction, such that, seen in the circumferential direction, their tooth spacing is in each case greater than their tooth length.

25. The filter insert as recited in claim 24, wherein, seen in the radial direction, the teeth of the second coupling elements of the filter insert have asymmetrical tooth edges, in each case the one tooth edge running essentially in the circumferential direction, and the respective other tooth edge running at an angle to the circumferential direction, and the tooth backs running in the axial direction.

26. The filter insert as recited in claim 17, wherein the toothings of the coupling elements of the filter insert each have two to six teeth distributed over the circumference.

27. The filter insert as recited in claim 24, wherein the second coupling elements of the filter insert are simultaneously fashioned as snap elements acting in the circumferential direction.

\* \* \* \* \*